(No Model.) 2 Sheets—Sheet 1.

E. J. GRIFFITHS & J. G. MILLER.
TIRE FASTENER.

No. 497,786. Patented May 23, 1893.

Witnesses
J. F. Coleman
F. W. Kerner

Edward J. Griffiths
Julius G. Miller
Inventors
By D. C. Fitzgerald
Attorney (No Model.) 2 Sheets—Sheet 2.

E. J. GRIFFITHS & J. G. MILLER.
TIRE FASTENER.

No. 497,786. Patented May 23, 1893.

Witnesses
Inventors
Edward J. Griffiths
By S. C. Fitzgerald
Attorney

UNITED STATES PATENT OFFICE.

EDWARD J. GRIFFITHS AND JUNIUS G. MILLER, OF NEKIMI, WISCONSIN.

TIRE-FASTENER.

SPECIFICATION forming part of Letters Patent No. 497,786, dated May 23, 1893.

Application filed January 31, 1893. Serial No. 460,354. (No model.)

*To all whom it may concern:*

Be it known that we, EDWARD J. GRIFFITHS and JUNIUS G. MILLER, citizens of the United States, residing at Nekimi, in the county of Winnebago, State of Wisconsin, have invented certain new and useful Improvements in Supplemental Tires and Tire-Fasteners; and we do hereby declare the following to be a full, clear, and exact description of the invention, such as will enable others skilled in the art to which it appertains to make and use the same.

Our invention relates to an improvement in supplemental tires and tire-fasteners.

The invention will first be described in connection with the accompanying drawings, and then pointed out in the claims.

Figure 1:
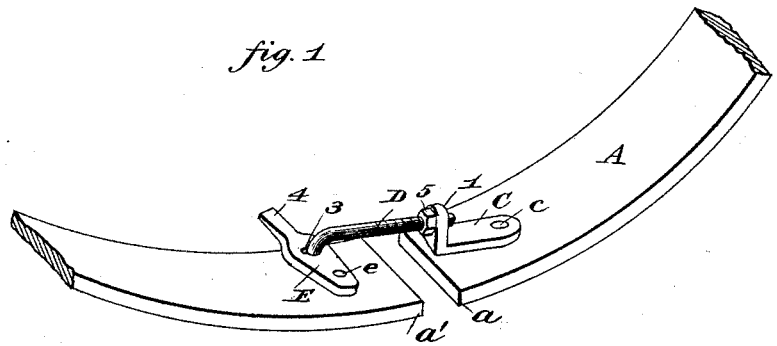
Figure 2:
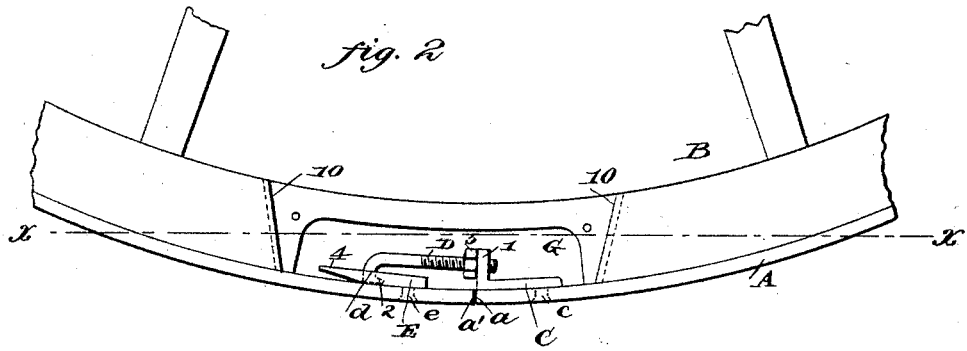
Figure 3:
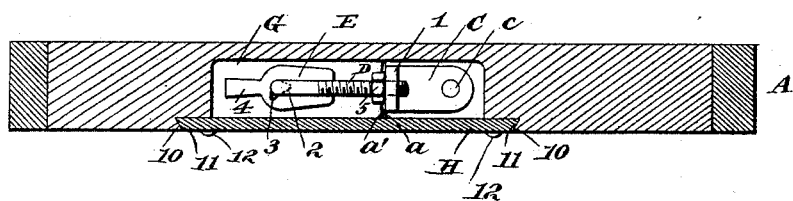
Figure 8:
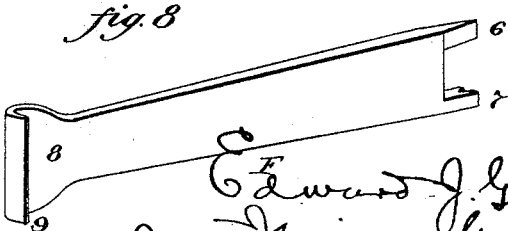
Figure 4:
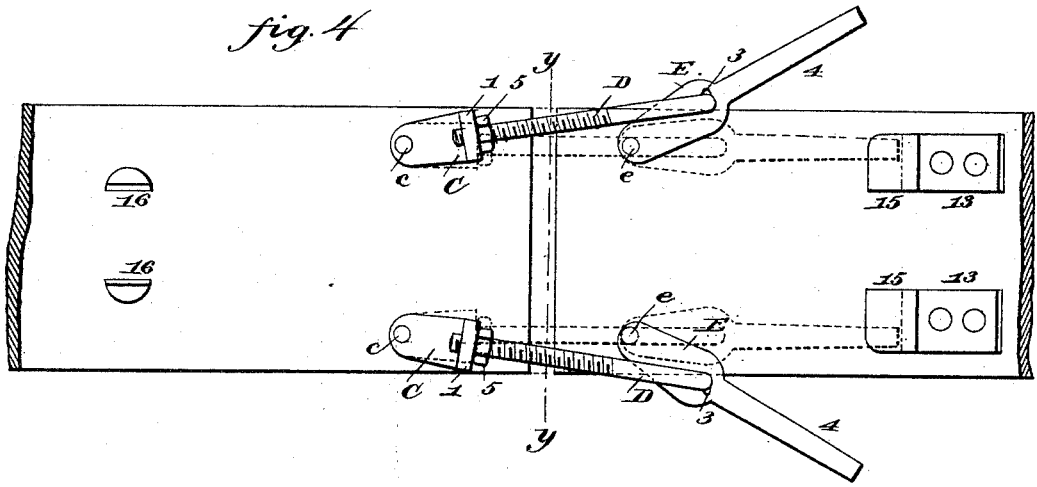
Figure 6:
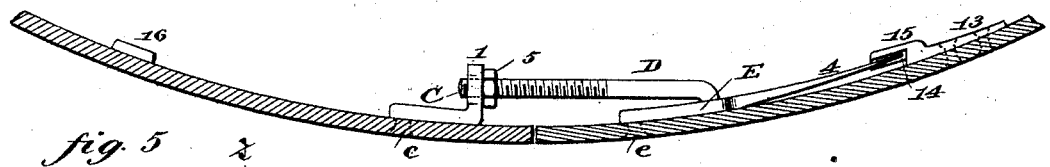
Figure 5:
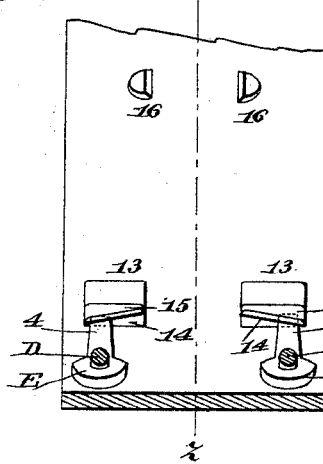
Figure 7:
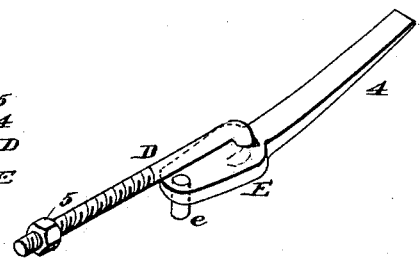

In the drawings, Figure 1 is a perspective view of our improved tire and fastening device, in place on a section of the tire, the ends of the tire being apart and the fastening device open. Fig. 2 is a side elevation of a portion of a wheel provided with our improved tire-fastening, the recess cap being removed. Fig. 3 is a horizontal section on line $x..x$, Fig. 2. Fig. 4 is a horizontal sectional view of an emergency tire embodying our improvements. Fig. 5 is a transverse section on the line $y..$, Fig. 4. Fig. 6 is a longitudinal section on the line $z..z$, Fig. 5. Fig. 7 is a detail view of the catch-lever and the draw-bolt. Fig. 8 is a detail view of the adjusting tool.

Referring to the drawings, A is the tire having the ends $a$ and $a'$ which are adapted to meet each other around the wheel B. Each end of the tire is provided with a pivot-hole, countersunk on the outer side.

C is an angle-brace provided with a pivot-stud $c$ adapted to pass through one of the pivot-holes in the meeting ends of the tire, and to be riveted on the outer end to fill the countersink, whereby the angle-brace is pivotally held to one end of the tire. The projecting lug $l$ of the angle-brace is provided with a threaded-bolt-hole, in which is secured one end of a draw-bolt D having its other end bent downward and provided with a pivot-stud $d$, which has an elongated thread 2 adapted to pass through an elongated opening 3 in a catch-lever E, the head registering with the opening when in one position, but preventing the withdrawal of the pivot-stud $d$ when turned away from the position in which the head and opening register.

The catch-lever E has a pivot-stud $e$ at one end which is pivotally secured in the hole in the meeting end of the tire opposite that one where the angle-brace is pivoted, and in a manner similar to that in which said angle-brace is secured; the catch-lever is also provided with a free end 4.

The draw-bolt D is provided with an adjusting-nut 5 as shown.

F is an adjusting tool, having the projecting spanners 6 and 7, one 6, being provided with a sharp point, and the other, 7, being grooved. The opening between these spanners is of such size as to fit over the nut 5 on the draw-bolt D; the opposite end of the adjusting tool is provided with a flattened portion 8 whose external edge is bent down at right angles as shown at 9.

It is apparent that when the catch-lever E is thrown out the draw-bolt will free the two ends $a$ $a'$, of the tire A apart, and when the catch-lever is thrown in, the ends of the tire will be drawn together. When the catch-lever is thrown around until in a direction nearly opposite to that which it occupies when closed, the elongated head 2 registers with the elongated opening 3 and the draw-bolt D may have its pivot-stud $d$ withdrawn from the opening. The nut 5 may then be loosened by means of the wrench-opening of the adjusting tool F and the bolt D screwed either farther in or out as may be necessary, the nut 5 being then tightened. The pivot-stud $d$ is again inserted in the opening 3 and the catch-lever swung far enough around to prevent the elongated head 2 and the opening 3 from registering.

To use a tire and our improved fastening, it becomes necessary to cut a recess G in the felly of the wheel, in which the fastening device may be inserted, the sides of the recess being dovetailed at 10 for the reception of the dovetailed edges 11 of the recess-cap H, which covers the fastening device from the action of the mud, &c., and which is prevented from slipping out of position by means of screws 12, passing through the cap and into the felly.

In Figs. 4, 5 and 6 we have shown an additional or emergency tire, designed to be placed around an ordinary wheel which is already supported with a tire, being much wider than the ordinary tire in order to give greater bearing for the wheels and adapted for temporary use in muddy weather, &c. We have shown this additional tire provided with two fastening devices, the space between them being occupied by the wheel.

To prevent the catch-levers from swinging out accidentally, catch-lugs 13 are fastened to the tire as shown, the under surface 14 and 15 of each projecting lug being beveled as shown, and the catch-lever manufactured of some spring metal so that it may be swung beneath the lug by pressing down on it, after which it is pushed inward until it strikes the wheel which prevents farther motion in that direction, the beveled under surface 14 stopping any accidental movement outward of the catch-lever.

The additional tire is also provided with stop-lugs 16, being arranged on each side of the wheel to prevent any side movement of the extra tire.

To swing the catch-levers out the edge 9 of the adjusting tool F is inserted between the catch-lever and the wheel, power being applied by the hand to pry the lever out. The grooved end 7 of the tool is used to press the catch-lever beneath the catch lugs, the groove engaging the corner of the lever and preventing the tool from slipping. The end 6 is sharpened to serve as a screw driver in removing the screws 12.

Having thus fully described our invention, what we claim, and desire to secure by Letters Patent, is—

1. In a tire tightener, the combination with a tire, of an angle brace pivoted to one end thereof, and having a screw threaded opening, a catch lever, pivoted to the other end of the tire, and a draw bolt, having a screw threaded end adapted to engage the screw threaded opening in the angle brace, the other end of said draw bolt being L-shaped and detachably connected to said catch lever, substantially as described and for the purpose set forth.

2. In a tire tightener, the combination, with a tire, of an angle brace pivoted to one end thereof and having a screw threaded opening, a catch lever pivoted to the other end of the tire and having a key hole slot, and a draw bolt having a screw-threaded end engaging the screw threaded aperture in the angle brace, the other end of said draw bolt being provided with a depending hook adapted to engage the key hole slot in the catch lever, as described.

In testimony whereof we affix our signatures in presence of two witnesses.

EDWARD J. GRIFFITHS.
JUNIUS G. MILLER.

Witnesses:
W. K. SCRIBNER,
R. B. EVANS.